US010366242B2

(12) United States Patent
Balinsky et al.

(10) Patent No.: US 10,366,242 B2
(45) Date of Patent: Jul. 30, 2019

(54) PREVENTION OF A PREDETERMINED ACTION REGARDING DATA

(71) Applicant: HEWLETT PACKARD ENTERPRISE DEVELOPMENT LP, Houston, TX (US)

(72) Inventors: Helen Balinsky, Bristol (GB); David Subiros Perez, Bristol (GB); James C. Cooper, Bloomington, IN (US); Kas Kasravi, Fort Collins, CO (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 255 days.

(21) Appl. No.: 15/500,922

(22) PCT Filed: Dec. 23, 2014

(86) PCT No.: PCT/US2014/072231
§ 371 (c)(1),
(2) Date: Jan. 31, 2017

(87) PCT Pub. No.: WO2016/105399
PCT Pub. Date: Jun. 30, 2016

(65) Prior Publication Data
US 2017/0235965 A1 Aug. 17, 2017

(51) Int. Cl.
*H04L 29/06* (2006.01)
*G06F 21/60* (2013.01)
(Continued)

(52) U.S. Cl.
CPC .......... *G06F 21/604* (2013.01); *G06F 9/4843* (2013.01); *G06F 16/122* (2019.01)

(58) Field of Classification Search
CPC ................ G06F 21/604; G06F 9/4843; G06F 17/30082; G06F 16/122
See application file for complete search history.

(56) References Cited

U.S. PATENT DOCUMENTS 7,171,390 B1 * 1/2007 Song ...................... G06F 8/60 705/51
7,650,501 B1 * 1/2010 Brunette, Jr. ....... G06F 21/6218 713/165

(Continued)

FOREIGN PATENT DOCUMENTS

WO   WO-2012057581 A2   5/2012

OTHER PUBLICATIONS

Cisco, "The CASB & Cloud Cybersecurity Platform," Datasheet, Feb. 12, 2017, pp. 1-2, Available at: <resources.cloudlock.com/data-sheets/cloudlock-security-fabric>.

(Continued)

*Primary Examiner* — Sarah Su
(74) *Attorney, Agent, or Firm* — Hewlett Packard Enterprise Patent Department

(57) ABSTRACT

According to an example, a performance of a predetermined action with regard to a data may be prevented. In the method, a first system call pertaining to the data may be intercepted and suspended. A determination may be made as to whether a second system call that is to be executed following execution of the first system call will result in performance of a predetermined action with regard to the data. In addition, an operation may be implemented on the first system call to prevent the performance of the predetermined action with regard to the data.

15 Claims, 6 Drawing Sheets

(51) Int. Cl.
*G06F 9/48* (2006.01)
*G06F 16/11* (2019.01)

(56) References Cited

U.S. PATENT DOCUMENTS

| | | | |
|---|---|---|---|
| 9,326,145 B2* | 4/2016 | Awan | H04L 63/107 |
| 2005/0060561 A1* | 3/2005 | Pearson | G06F 21/57 |
| | | | 713/194 |
| 2008/0168135 A1 | 7/2008 | Redlich et al. | |
| 2009/0049550 A1* | 2/2009 | Shevchenko | G06F 21/52 |
| | | | 726/23 |
| 2009/0070746 A1* | 3/2009 | Dhurjati | G06F 11/3676 |
| | | | 717/128 |
| 2010/0161550 A1 | 6/2010 | Lin et al. | |
| 2011/0185209 A1* | 7/2011 | Shimotono | G06F 1/3203 |
| | | | 713/323 |
| 2013/0212067 A1 | 8/2013 | Piasecki et al. | |
| 2013/0219176 A1 | 8/2013 | Akella et al. | |
| 2013/0268997 A1* | 10/2013 | Clancy, III | G06F 21/53 |
| | | | 726/1 |
| 2013/0275509 A1 | 10/2013 | Micucci et al. | |
| 2013/0304842 A1* | 11/2013 | Zachariassen | G06F 16/172 |
| | | | 709/213 |
| 2014/0006347 A1 | 1/2014 | Qureshi et al. | |
| 2014/0026181 A1 | 1/2014 | Kiang et al. | |
| 2014/0032691 A1* | 1/2014 | Barton | H04L 41/00 |
| | | | 709/206 |
| 2014/0075130 A1 | 3/2014 | Bansal et al. | |
| 2014/0137273 A1 | 5/2014 | Workman | |
| 2014/0149461 A1* | 5/2014 | Wijayaratne | G06F 17/30194 |
| | | | 707/785 |
| 2014/0173700 A1* | 6/2014 | Awan | H04L 63/107 |
| | | | 726/4 |
| 2014/0194094 A1* | 7/2014 | Ahuja | H04W 4/021 |
| | | | 455/410 |
| 2014/0201807 A1* | 7/2014 | White | G06F 21/53 |
| | | | 726/1 |
| 2014/0365753 A1* | 12/2014 | Hooker | G06F 9/30058 |
| | | | 712/239 |
| 2015/0067096 A1* | 3/2015 | Marano | H04L 67/1095 |
| | | | 709/217 |
| 2015/0234677 A1* | 8/2015 | Bartley | G06F 11/3466 |
| | | | 718/102 |

OTHER PUBLICATIONS

CoSoSys Ltd., "Data Loss Prevention for Cloud Services," 2014, pp. 1-6, Available at: <endpointprotector.com/solutions/data_loss_prevention_cloud>.

Helen Balinsky et al., "System Call Interception Framework for Data Leak Prevention," 2011, pp. 1-10, IEEE.

International Search Report and Written Opinion, International Application No. PCT/US2014/072231, dated Jul. 27, 2015, pp. 1-7, KIPO.

Jake Williams, "Detecting Data Loss from Cloud Sync Applications," 2013, pp. 1-53, Available at: <digital-forensics.sans.org/summit-archives/DFIR_Summit/Detecting-Data-Loss-from-Cloud-Synchronization-Applications-Jake-Williams.pdf>.

Laura O'Brien, "User Ignorance of Cloud Services Poses a Data Leak Challenge," Jul. 12, 2013, pp. 1-2, Symantec Corporation, Available at: <symantec.com/connect/blogs/user-ignorance-cloud-services-poses-data-leak-challenge>.

McAfee, "McAfee Data Loss Prevention Endpoint 9.3.150," Nov. 18, 2013, pp. 1-196, Product Guide, Revision A, Available at: <kb.mcafee.com/resources/sites/MCAFEE/content/live/PRODUCT_DOCUMENTATION/24000/PD24874/en_US/dlpe_93150_pg_en-us.pdf>.

Symantec Corporation, "Symantec O3 Delivers New Security Control Point for the Cloud," RSA Conference, Feb. 28, 2012, pp. 1-6, Available at: <symantec.com/about/newsroom/press-releases/2012/symantec_0228_01>.

* cited by examiner

PREVENTION OF A PREDETERMINED ACTION REGARDING DATA

BACKGROUND

Some companies provide a number of cloud infrastructures that offer a wide range of cloud services and cloud-based data storage. One type of cloud-based data storage enables users to install folders on their computing devices, in which the folders are synchronized to a cloud-based data storage. In order to upload files onto the cloud-based data storage, for instance, to be accessed on any of the computing devices, users simply save the files onto a synchronized folder. The act of saving a file onto the synchronized folder typically causes the file to be automatically uploaded to the cloud-based data storage.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
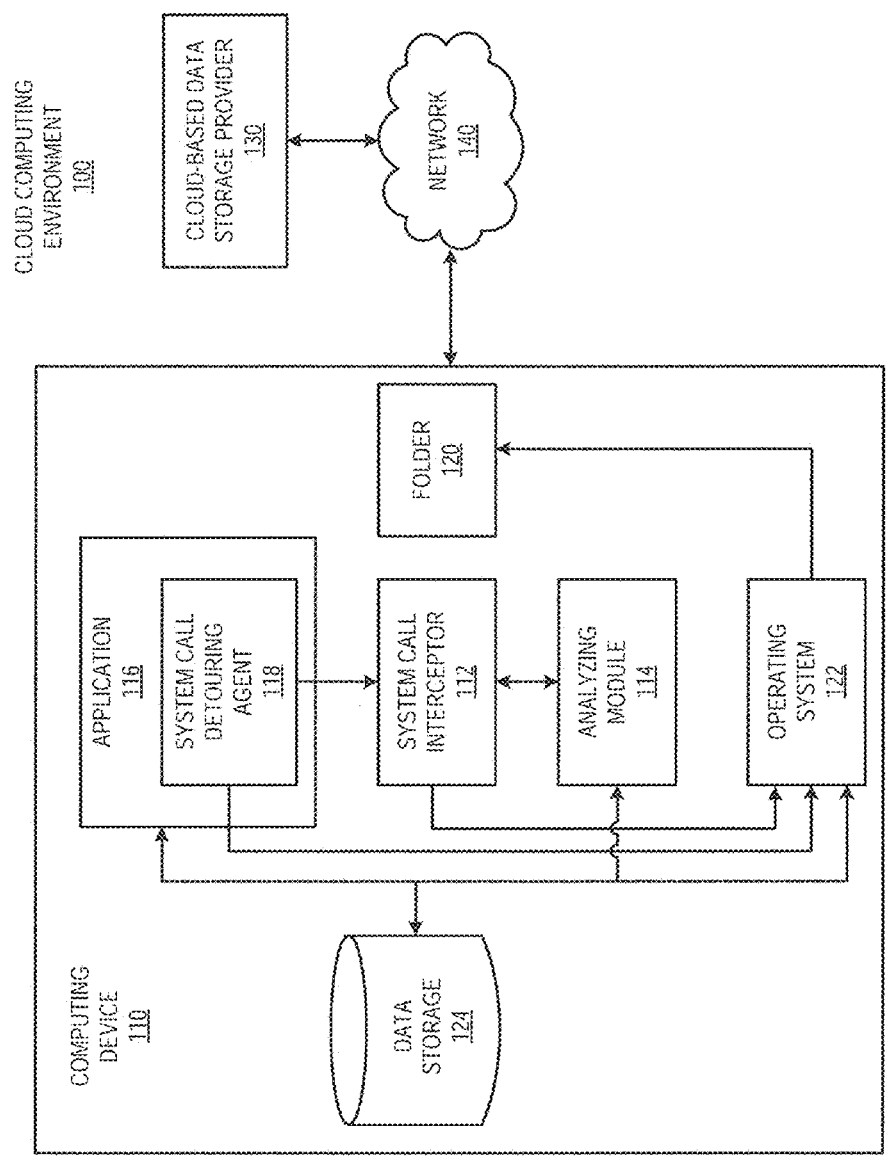
FIG. 1 is a simplified diagram of a cloud computing environment, on which various aspects of the methods and computing devices disclosed herein may be implemented, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are a method, computing device, and computer-readable medium for preventing performance of a predetermined action regarding a data. In the method disclosed herein, a first system call pertaining to a data may be intercepted and suspended. A determination may be made as to whether a second system call that is to be executed following execution of the first system call will result in performance (or equivalently, occurrence) of a predetermined action with regard to the data. In response to a determination that the second system call will result in the performance, e.g., execution, of the predetermined action with regard to the data, an operation may be implemented on the first system call to prevent the predetermined action from being performed.

The operation implemented on the first system call may include any suitable operation that prevents the predetermined action from being performed. The predetermined action may include, for instance, an accidental or an intentional action on the data. By way of example, the predetermined action may be an accidental or intentional attempt to place data into a folder through which the data may be outputted from the computing device on which the folder is stored. The operation may include any of a number of operations that prevent the predetermined action from being performed. These include, for instance, blocking execution of the first system call such that the second system call is not triggered, thus preventing the data from being outputted. In addition, or alternatively, the action may include replacing the data with other data, for instance, original data that has been redacted, data that is not sensitive, empty data, encrypted data, etc., and permitting the first system call to be executed. In this example, the second system call may be permitted to be executed, but with the replaced data. The action may further include modifying the destination, e.g., destination folder, of the data and permitting the first system call to be executed. In this example, the second system call may be executed, but because the data is not stored in the folder to which the second system call is executed, the second system call may not be performed with regard to the data. In other words, the second system call may not be performed on the data or the second system call may be performed on a modified version of the data or on different data.

According to a particular example, the first system call is a system call made by an application to an operating system to place data into a designated folder. The first system call may be from the family of File Management system calls or as it is often called File I/O (e.g., functionality to create, open, close, read, write, reposition a file, etc.). In this example, the designated folder is a folder that is to be automatically synchronized with a cloud-based data storage provider. In addition, the second system call is a system call in the family of Communication (networking) system calls, such as network card access, socket calls, etc. For instance, the second system call may be initiated by a folder synchronization agent and may cause any data placed in the designated folder to be uploaded to a remote storage location of the cloud-based data storage provider.

Through implementation of the methods, computing devices, and computer-readable mediums disclosed herein, performance of a predetermined action on a data may be prevented. By preventing the performance of the predetermined action, unpermitted or undesired communication or export of the data from the computing device may be prevented. The predetermined action may be prevented, for instance, by blocking or modifying an earlier system call, thus preventing a later system call from causing the predetermined action from being performed. By way of particular example, blocking or modifying of the earlier system call may prevent data from automatically being uploaded to a cloud-based data storage provider. That is, by preventing the file from being placed into the synchronized folder, an assigned synchronization agent will not be triggered and subsequently the data not be synchronized. In addition, blocking or modifying of the earlier system call may result in improved usability as feedback to a user may be provided in a relatively quick manner following blockage or modification of the earlier system call. Moreover, blocking or modifying of the earlier system call may result in improved ability to evaluate the data as the data may not be available following execution of the earlier system call, e.g., the original folder that a file is being copied or moved from, file contents and embedded meta-data may be encrypted by a synchronization agent and thus cannot be analyzed, etc.

With reference first to FIG. 1, there is shown a simplified diagram of a cloud computing environment 100, on which various aspects of the methods and computing devices disclosed herein may be implemented, according to an example. It should be understood that the cloud computing environment 100 depicted in FIG. 1 may include additional elements and that some of the elements depicted therein may be removed and/or modified without departing from a scope of the cloud computing environment 100. For instance, the cloud computing environment 100 may include any number of computing devices, cloud-based data storage providers, and networks.

As shown in FIG. 1, the cloud computing environment 100 may include a computing device 110 in communication with a cloud-based data storage provider 130 through a network 140, which may be the Internet, a wide area network, etc. The computing device 110 may be an end user device that is to connect to the network 140 such that data may be communicated between the computing device 110 and the cloud-based data storage provider 130 via the network 140. For instance, the computing device 110 may be a personal computer, a laptop computer, a tablet computer, a mobile telephone, etc. The cloud-based data storage provider 130 may provide various cloud-based storage services to the computing device 110, such as automatic backup of selected data from the computing device 110. The cloud-based data storage provider 130 may also enable for the data to be shared among a number of user computing devices, such that data uploaded from one computing device may automatically be available on another computing device. The data, which is equivalently referenced herein as a data object, may be any of a file, a photograph, a document, a video, a program, etc.

According to an example, a user may install a program supplied by the cloud-based data storage provider 130 on the multiple computing devices, in which the program causes a synchronized folder to be created on the multiple computing devices. That is, the created folder may be synchronized with another folder on the cloud-based data storage provider 130, such that data uploaded through the created folder on a computing device 110 is uploaded to the folder on the cloud-based data storage provider 130. In addition, the data uploaded to the folder on the cloud-based data storage provider 130 may be available for downloading onto any of the user computing devices on which the synchronized folder has been created. In various instances, data is uploaded automatically from the synchronized folder on the computing device 110 to the folder on the cloud-based data storage provider 130 immediately following placement of the data into the synchronized folder, as long as the computing device 110 is connected to the network 140. That is, a user may not need to perform any additional actions prior to the data placed into the synchronized folder from being uploaded to the folder on the cloud-based data storage provider 130 and subsequently further to any other users with access to this cloud based storage.

In one regard, once the data has been placed into the synchronized folder, the user may not easily prevent the data from being uploaded to the cloud-based data storage provider 130. For instance, synchronization of the folder may occur prior to the user being able to remove the data from the folder. If the user unintentionally, or with malicious intent, places data into the synchronized folder or if the data contains information that is not to be uploaded to the cloud-based data storage provider 130, the data may be leaked, e.g., may unintentionally or improperly be uploaded, to the cloud-based data storage provider 130. This may be cause for concern, for instance, if the data contains confidential information or information that is otherwise not intended to be made public, e.g., shared with other parties having access to the synchronized folder Furthermore, the data may be leaked to a malicious entity, for instance, if the cloud-based data storage provider 130 or the network 140 is compromised. Although the majority of cloud-based data storage providers offer relatively secure services and attempt to keep the data that the cloud storage providers receive confidential, errors may still arise, for instance, if a cloud-based data storage provider is maliciously attacked. Additionally, a synchronized folder is often shared by multiple parties and as such, once a file is wrongly placed into a local folder by one of the parties, the content is synchronized to the on-line storage and then to local folders of the other parties. The content may not be appropriate for them, may not have been intended to be shared with them, may be confidential, etc. Data that is misplaced may also result in not only exposure of information, misplacement may also result in information being lost or unavailable. Other consequences may include delay in workflow, missed deadline and delivery, etc. The parties in synchronization with the "wrong" folder may notice incorrect data being placed and may simply remove it. Further consequences may include data mix up, placement of data into the wrong folder, which may result in data sensitivity and compliance mix up. For instance, a file maybe placed into an online folder that is regularly tested for compliance, and such misplaced data will not be regularly tested for compliance.

As discussed in greater detail herein, a policy enforcement mechanism may be implemented in a computing device 110 that identifies which predetermined actions regarding data are to be prevented. Particularly, the policy enforcement mechanism disclosed herein may prevent the predetermined actions with regard to the data from be being performed. According to an example, the policy enforcement mechanism may prevent data from being placed into a synchronized folder until the data has been analyzed and approved for placement into the synchronized folder. That is, when an application issues a system call for the data to be placed into the synchronized folder, the system call may be intercepted and suspended, which may suspend the placement of the data into the synchronized folder. In addition, the data for which the system call was issued may be analyzed to determine whether the data is permitted to be placed into the synchronized folder. If the data is not permitted to be placed into the synchronized folder, the system call may be blocked, e.g., dropped, prevented from execution, etc., which may prevent the data from being placed in the synchronized folder. In this regard, the policy enforcement mechanism may operate as a data leak prevention mechanism.

In other examples, the predetermined actions with regard to data may include actions that result in information contamination. For instance, the predetermined actions may include actions that increase the size and cost beyond some predefined limit, actions that break document workflows and access (e.g., actions that enable personnel with lower access that were able to previously access files to no longer access those files), etc. The predetermined actions may also pertain to actions that result in information misplacement that may result in information loss (where misplaced information cannot be found because the location of the information is unknown), deletion of misplaced information, etc. The predetermined actions may still further pertain to actions that may result in denial of access to the data, breach in data handling policies (e.g., retention, compliance), etc.

According to another example, an operation may be implemented on a first system call to prevent predetermined action with regard to the data from occurring. In this example, the first system call may be part of a deterministic sequence of system calls, in which a latter system call may result in the performance or occurrence of the predetermined action. That is, the latter system call, which is also referred herein as a second system call, may be triggered or executed following execution of the first system call. The second system call may not be executed immediately following execution of the first system call, e.g., there may be other related and unrelated system calls executed between first system call and the second system call). By implementing an operation on the first system call, such as by blocking the first system call, modifying the data pertaining to the first system call, modifying a destination folder of the data pertaining to the first system call, etc., the latter system call may either be prevented or execution of the latter system call may still prevent the predetermined action from occurring.

The computing device 110 is depicted as including a system call interceptor 112, an analyzing module 114, an application 116, a system call detouring agent 118, a folder 120, an operating system 122, and a data storage 124. As discussed in greater detail herein below, the system call interceptor 112 is to intercept some or all of the system calls that the application 116 makes to the operating system 122. By way of example, the system call interceptor 112 may intercept some or all of the system calls that precede the system call that may result in data being misplaced/exported out of the computing device 110. For instance, the system call interceptor 112 may intercept some or all of the system calls that are part of a deterministic sequence of system calls, in which one of the system calls in the sequence may result in undesired, prohibited or monitored data action. In this example, an action may be implemented on the intercepted system call to prevent a latter system call from exporting sensitive data as discussed in greater detail herein.

According to a particular example, the system call interceptor 112 may intercept some or all of the system calls made by the application 116 to place data in the folder 120, in which a latter system call is to cause the data to be outputted from the folder 120. The folder 120 may be a folder that is to be automatically synchronized with the cloud-based data storage provider 130. That is, in an example, when the application 116, which may be a document processing application, an image processing application, a spreadsheet processing application, a web browser application, or any other application that may store data into the folder 120, is to place data, such as a data object, which may be a file, a document, an image, a video, an audio file, etc., into the folder 120, the application 116 may make a system call to the operating system 122 to write the data into the folder 120. The specific system call may have a synchronized folder as its destination parameter. The system call may be, for instance, a WriteFile, CopyFile, MoveFile, Rename, a data drop into the folder 120, etc., system call, and may point to the folder 120. As another example, the folder 120 may be printer SPOOLER folder from which data is automatically outputted to a printing device (not shown) by a spooler service.

The system call interceptor 112 may include hardware and/or machine readable instructions that the hardware may execute. In an example, the hardware of the system call interceptor 112 may include a processor (not shown) of the computing device 110. In addition, the configuration of the system call interceptor 112 may be based upon the link between the action and the system calls for various applications in the computing device 110. A system call may be defined as a call from the application 116 to the operating system 122 that requests/instructs the operating system 122 to perform an action associated with the call. A system call may provide an interface between a user level process (e.g., running the application 116) and the operating system 122 of the computing device 110. A system call may include higher level calls to dynamic-link libraries (DLLs), application programming interfaces (APIs), or other components (BHOs). In addition, different operating systems 122 may have different interfaces, which may depend, at least in part, on the operating system 122 architecture, structure, and implementation. As such, different versions of the system call interceptor 112 may be utilized with different operating systems 122.

The application 116 may make or issue a system call to the operating system 122 in response to receipt of an instruction from a user to copy and paste data from the data storage 124 into the folder 120 (e.g., through the Windows Explorer™ application). The application 116 may also make or issue the system call, for instance, in response to a user input to cut and paste a data object, drag and drop a data object (e.g., executed by Windows Explorer™ in the Windows OS™), save the data object as an object in the folder, etc. As a further example, the application 116 may automatically make the system call when a copy of the object is to be backed up in the folder 120. The application 116 may make the system call in other instances in which a data object is to be placed into the folder 120.

According to an example, the system call interceptor 112 may run in the background of the computing device 110 to intercept the system calls emitted (e.g., made, issued, transmitted, communicated, etc.) by the application 116. In this example, the system call interceptor 112 may determine for each intercepted system call, whether the system call may result in a policy controlled action, such as when the destination of the system call points to the folder 120. If the intercepted system call may result in a predetermined action with regard to the data, such as the data being placed into a restricted folder, a folder that is to be automatically synchronized with a cloud-based data storage provider 130, the data being outputted from the computing device 110, etc. For example, when the destination of the system call points to the folder 120, the system call interceptor 112 may suspend the system call and may instruct the analyzing module 114 to analyze the data and meta-data that are the subject of the system call. The destination of the system call may be defined as indicating that the effect of the system call is on the particular destination, such as the folder 120. Various manners in which the analyzing module 114 may operate are discussed in greater detail herein below.

If a determination is made that the suspended system call may not result in the performance of a predetermined action with regard to the data, for instance, the destination of the system call does not point to the folder 120, etc., the system call interceptor 112 may allow the system call to be executed by the operating system 122 immediately without instructing the analyzing module 114 to analyze the data. In another example in which the folder 120 is the destination to which the system call points, but the system call is not to cause the performance of a predetermined action with regard to the data, the system call interceptor 112 may also forward the system call to the operating system 122 without instructing the analyzing module 114 to analyze the data. In these instances, the operating system 122 may perform the system call and cause performance of the predetermined action on the data that is the subject of the system call, for instance, cause the data to be placed into the folder 120.

According to an example, a system call detouring agent 118 may be inserted into the application 116. In other examples, a system call detouring agent 118 may be inserted into each application that may cause a predetermined action with regard to the data to be performed. In any regard, the system call detouring agent 118 may be inserted into the application 116 when the application 116 is installed onto the computing device 110. In addition, the application 116 may be monitored, for instance by an independent polling agent (not shown) to determine if the system call detouring agent 118 has been removed and if so, the system call detouring agent 118 may be re-inserted into the application 116. If the re-insertion is unsuccessful, the application 116 may be suspended or otherwise prevented from being able to place data into the folder 120. As another example, the monitoring and detouring action may be placed in the OS kernel mode, in which the OS kernel mode watches for any application attempting to execute a particular system call.

The system call detouring agent 118 may track the destinations to which the system calls made by the application 116 point and may redirect a system call that is part of a sequence of system calls that may result in the performance of a predetermined action with regard to the data to the system call interceptor 112. In another example, the system call detouring agent 118 may direct some or all of the system calls issued by the application 116 to the system call interceptor 112. In any regard, the system call detouring agent 118 may permit the system calls that are not part of a sequence of system calls that may result in the performance of a predetermined action, as identified by a set of policies, with regard to the data to be permitted to reach the operating system 122 without first being analyzed by the system call interceptor 112. These types of system calls may be those that have destinations that do not point to the folder 120, system calls to remove data objects from the folder 120, etc.

In any of the examples above, the system call interceptor 112 may suspend the received system calls from being executed and may thus prevent the actions associated with the system calls from being executed. That is, the system call interceptor 112 may suspend the system calls before the system calls reach the operating system 122. As a result of the suspension, the operating system 122 may not receive the system calls and therefore, the actions associated with the system calls may not be executed. In one regard, therefore, the data may be prevented from being uploaded to the cloud-based data storage provider 130 because the data was not placed into the folder 120 in the first place, which may be synchronized with the cloud-based data storage provider 130 or connected to a printer SPOOLER as discussed above.

While a system call is suspended, the analyzing module 114 may analyze the data corresponding to the system call to determine whether a second system call that is to be executed following execution of the system call will result in performance of a predetermined action with regard to the data. The analyzing module 114 may make the determination based upon an analysis of the information about the data and/or information contained in the data with respect to a set of predefined policies. The information about the data may be captured data and metadata of the data, data origin information, data owner information, destination information, etc. The analyzing module 114 may scan and parse the information about the data and/or may scan and parse the content of the data to determine, for instance, based upon the analysis of the data with respect to the set of predefined policies, whether the data meets or violates any of the policies contained the set of predefined policies. The analyzing module 114 may consider/evaluate other information, such as for example date/day and time of a captured action, user identity and or his role, according to set/deployed policies, etc. For example, a user may place a document into a particular company folder during working hours for backup or compliance reasons, and might be not allowed to do so outside of working hours. A user in a particular role may be given a right to read data from a particular synchronized folder, but not add new documents or add new documents that do not adhere to a predetermined pattern/s and/or classification.

For instance, the predefined set of policies may indicate that only documents originating from a particular user may be outputted from the computing device 110, placed into the folder 120, etc. As an alternative example, the predefined set of policies may indicate that documents originating from the particular user may not be outputted from the computing device 110, placed into the folder 120, etc. As another example, the predefined set of policies may indicate that documents having contents with the word "confidential" or classified as "confidential" may not be outputted from the computing device 110, placed into the folder 120, etc. As a yet further example, the predefined set of policies may indicate that certain documents are allowed to be outputted from the computing device 110, placed into the folder 120 if the folder 120 is synchronized to a certain cloud-based data storage provider 130 but not to a different cloud-based data storage provider, etc.

The analyzing module 114 may additionally or alternatively analyze the system call itself to make this determination. For instance, the predefined set of policies may indicate that performance of certain types of system calls will cause the performance of other types of system calls. By way of example, the predefined set of policies may indicate that a system call to store data into the folder 120 will result in the execution of another system call to output the data contained in the folder 120 to the cloud-based data storage provider 130. In this regard, the analyzing module 114 may analyze the system call to determine whether execution of the system call will result in the execution of a second system call that will result in the performance of a predetermined action with regard to the data.

The policies in the predefined set of policies may be set according to a desired mode of operation of the analyzing module 114. That is, for instance, the policies may be set according to the level of security desired in preventing the performance of the predetermined action with regard to the data to, for instance, prevent data from being unintentionally or maliciously outputted from the computing device 110. By way of example, under a minimal security level setting, data intended for placement into folders synchronized to untrusted cloud-based data storage providers may be blocked while data intended for placement into folders synchronized to trusted cloud-based data storage providers may be allowed. Under a medium security level setting, only data from authorized client applications that are intended for placement into folders synchronized to trusted cloud-based data storage providers may be permitted and all other data may be prevented from being placed into the folders. Under an advanced security level setting, traffic for all non-authorized cloud-based data storage providers may be blocked and data upload/synchronization by all non-authorized agents may be blocked. In addition, only authorized clients may upload data to authorized cloud-based data storage providers. For example, under the advanced security level setting, the policies may authorize uploading of only some types of data but not other types of data to a particular cloud-based data storage provider. By way of particular example, non-confidential data may be uploaded to a cloud-based data storage provider 130 while confidential data may be uploaded to a private cloud storage.

The analyzing module 114 may operate in real time to minimize the time that the application 116 is blocked while the system call is suspended. In addition, the predefined set of policies may be stored locally in a data store (not shown) of the computing device 110. However, the predefined set of policies may additionally or alternatively be stored externally to the computing device 110.

In response to a determination that the second system call will result in performance of a predetermined action with regard to the data, the analyzing module 114 may implement an operation on the suspended system call to prevent the performance of the predetermined action. For instance, the analyzing module 114 may block the suspended system call from being delivered to the operating system 122. The analyzing module 114 may block the system call by discarding or dropping the system call. As another example, the analyzing module 114 may replace the data pertaining to the suspended system call with other data, such as with a redacted version of the data, a version of the data that contains limited information, an encrypted version of the data, etc. As a further example, the analyzing module 114 may modify the destination address of the data such that execution of the suspended system call may result in the data being placed into another destination folder, such as a local folder or another synchronized folder.

In addition, the analyzing module 114 may output a visual and/or audible indication, e.g., an error message, to inform a user that the requested action on the data may result in the performance of a predetermined action with regard to the data and was thus prevented from being performed. Moreover, the analyzing module 114 may input an entry into a log that the system call was blocked or modified, or more precisely, that a particular action executed by a user using a particular application was detected according to a specified policy, in which the action was prevented or modified according to the policy action, and the corresponding log was created The log may be retained locally or on a secure remote location. In any regard, the implementation of an operation on the suspended system call may prevent the performance of the predetermined action with regard to the data, e.g., placement of the data into the folder 120. In addition, in instances where the folder 120 is synchronized to a folder in the cloud-based data storage provider 130, an unmodified version of the data may be prevented from being uploaded to the cloud-based data storage provider 130 prior to an automatic synchronization operation being performed on the folder 120.

However, in response to a determination that the predetermined action with regard to the data will not be performed, the analyzing module 114 may free the suspended system call. For instance, the analyzing module 114 may remove the suspension on the system call and may permit the system call to be delivered to the operating system 122. Upon receipt of the system call, the operating system 122 may execute the system call, which may cause a latter system call to be performed, in which execution of the latter system call may result in the data being outputted from the computing device 110. For instance, the system call may cause the data to be placed into the folder 120 from the data storage 124 and the latter system call may cause the data to be automatically synchronized with the cloud-based data storage provider 130. By way of particular example, the system call may be freed in response to a determination that the data is permitted to be outputted from the computing device 110. In another instance, the system call may cause the data to be placed into the folder 120, which is SPOOLER folder of a printer and the latter system call may cause the data, which is a print job in the case, to be automatically submitted for printing.

Figure 2:
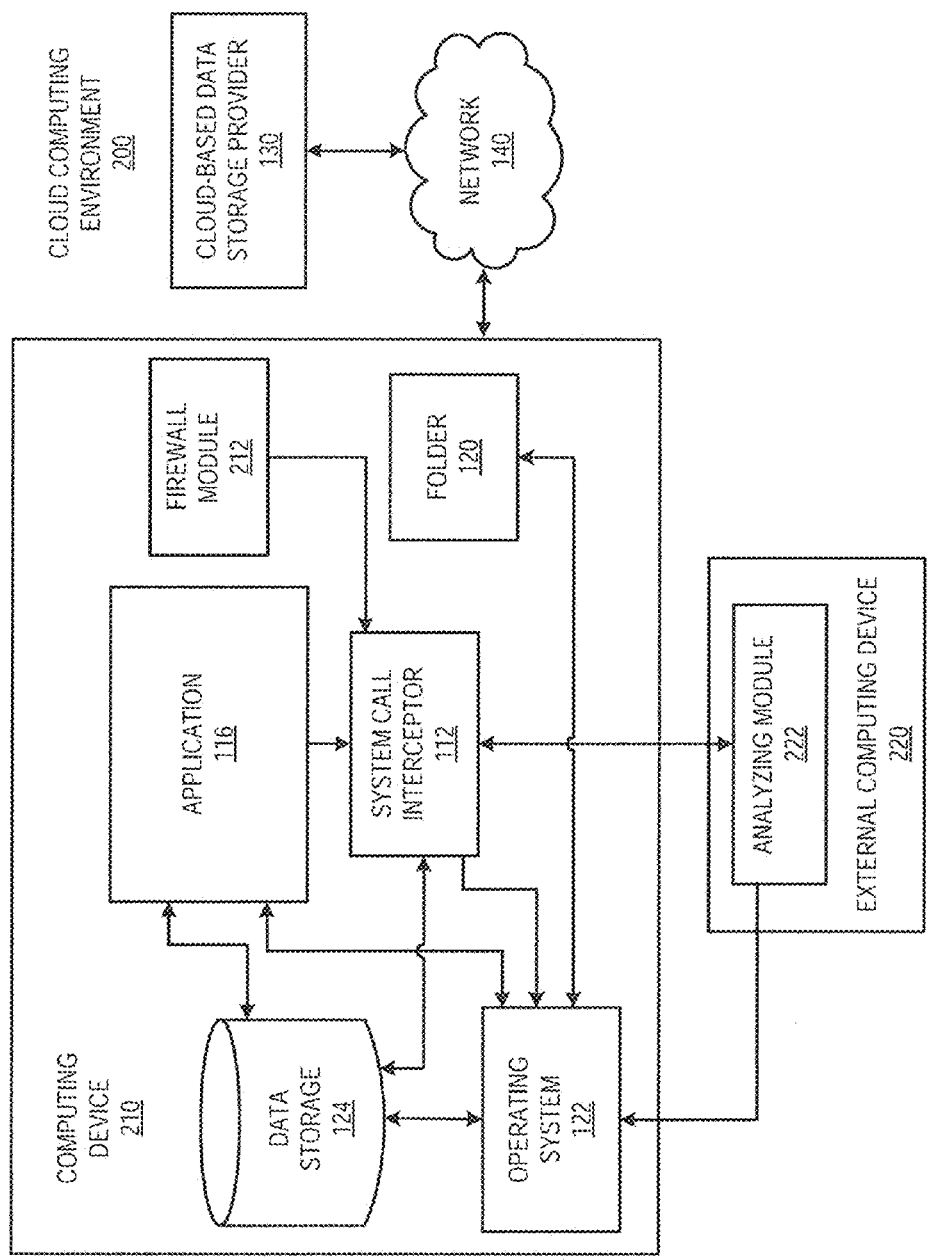
FIG. 2 is a simplified diagram of a cloud computing environment, on which various aspects of the methods and computing devices disclosed herein may be implemented, according to another example of the present disclosure.

Turning now to FIG. 2, there is shown a simplified diagram of a cloud computing environment 200, on which various aspects of the methods and computing devices disclosed herein may be implemented, according to another example. It should be understood that the cloud computing environment 200 depicted in FIG. 2 may include additional elements and that some of the elements depicted therein may be removed and/or modified without departing from a scope of the cloud computing environment 200.

The cloud computing environment 200 contains many of the same features as those contained in the cloud computing environment 100 depicted in FIG. 1. As such, only those features in the cloud computing environment 200 that differ from the features in the cloud computing environment 100 will be described in detail with respect to FIG. 2. In addition, it should be understood that some of the features in the cloud computing environment 100 may be added to and/or replaced with some of the features in the cloud computing environment 200 without departing from the scopes of the cloud computing environments 100, 200.

As shown in FIG. 2, the cloud computing environment 200 includes a computing device 210 in communication with a cloud-based data storage provider 130 through a network 140, which may be the Internet, a wide area network, etc. Similarly to the computing device 110, the computing device 210 may be an end user device. The cloud computing environment 200 is also depicted as including an external computing device 220. The external computing device 220 may be a server computer or other device that may include an analyzing module 222. The analyzing module 222 may perform the same functions as the analyzing module 114 depicted in FIG. 1. As shown, the computing device 210 may be in communication with the external computing device 220 such that information signals may be communicated between the computing device 210 and the external computing device 220. The computing device 210 may communicate with the external computing device 220 through any of a number of possible communication techniques. For instance, the computing device 210 may communicate with the external computing device 220 through a local area network connection, a wireless network connection, a Bluetooth connection, or the like.

In contrast to the computing device 110, therefore, the computing device 210 may not itself include an analyzing module to analyze data that is the subject of a system call made by the application 116, for instance, to place data into the folder 120. Instead, in the computing device 210, the system call interceptor 112 may intercept system calls from the application 116 having the folder 120 as the destination. The system call interceptor 112 may also suspend the system calls and may forward the data that is the subject of the system calls to the analyzing module 222 in the external computing device 220. The analyzing module 222 may analyze the data and/or the system call in manners similar to those described above with respect to the analyzing module 114. In this regard, the analyzing module 222 may determine whether the data is approved to be placed into the folder 120.

In response to a determination that a second system call to be executed following execution of a first system call will result in performance of a predetermined action with regard to the data, the analyzing module 222 may not deliver the first system call to the operating system 122. Instead, the analyzing module 222 may simply discard or drop the first system call. The analyzing module 222 may also communicate an instruction to the system call interceptor 112 to discard or drop the first system call. Alternatively, the analyzing module 222 may implement any of the other operations described herein with respect to the system calls to prevent performance of the predetermined action with regard to the data. In addition, the analyzing module 222 may communicate an instruction to the operating system 122 to output a visual and/or audible indication to inform a user that the system call was blocked or modified. Moreover, a dedicated interception agent running within the operating system 122 may input an entry into a log that the system call and the corresponding user operation/request were blocked or modified. The log may include a detailed description of the requested operation, the outcome of the analysis, user's role and/or identity, the decision taken and the corresponding policy. The log may also include a copy of the actual data and meta-data involved in the operation. The log may be kept locally and/or uploaded to a remote device immediately or periodically. The dedicated agent may also act more actively in notifying an administrator, especially so when the action is in a policy breach, or when there is an inconclusive decision and interference/approval from an administrator or manager is required. The dedicated agent may also require a confirmation and/or active approval from the user requested actions, for example by issuing a warning or requesting a user authentication to proceed with an action. In any regard, the blocking or modification of the system call may prevent the predetermined action from occurring, such as an unmodified version of the data processed by the system call may be prevented from being placed into the folder 120. In addition, in instances where the folder 120 is synchronized to a folder in the cloud-based data storage provider 130, the unmodified version of the data may be prevented from being uploaded to the cloud-based data storage provider 130 prior to an automatic synchronization operation being performed on the folder 120.

However, in response to a determination that the second system call will not result in the performance of a predetermined action, e.g., the data is allowed to be placed into the folder 120, the analyzing module 222 may instruct the system call interceptor 112 to free the system call. For instance, the analyzing module 222 may communicate an instruction to the system call interceptor 112 to remove the suspension on the system call and to permit the system call to proceed to the operating system 122. Upon receipt of the system call, the operating system 122 may perform the system call to cause the data to be leaked, e.g., placed into the folder 120 from the data storage 124.

As shown in FIG. 2, the computing device 210 may also include a firewall module 212. The firewall module 212 may implement firewall rules, for instance, to prevent data that meet predefined criteria from being outputted from the computing device 110. That is, the firewall module 212 may apply a set of policies to block certain data from being outputted from the computing device 110. According to an example, the set of policies may be applied to enforce the different security levels discussed above. For instance, under the minimal security level setting, the firewall module 212 may be set to block all traffic to predetermined destination IP addresses, such as those of unauthorized cloud-based data storage providers. Under the medium security level setting, the firewall module 212 may be set to both filter traffic by destination address and application type.

The firewall module 212 may inform the system call interceptor 112 that the security setting is one of the minimum and the medium settings. Under these settings, the system call interceptor 112 may allow the system calls from the application 116 to be delivered directly to the operating system 122 because the firewall module 212 may capture and prevent data from being transmitted to the cloud-based data storage provider 130.

Under the advanced security setting, the system call interceptor 112 may intercept system calls from the application 116 such that the data may be prevented from being leaked as described above. In addition, the firewall module 212 may block traffic from being outputted to certain IP destination addresses. In this regard, the system call interceptor 112 and the firewall module 212 may operate in a comprehensive manner to prevent unintended data from being transmitted out of the computing device 210, e.g., to the cloud-based data storage provider 130.

In one regard, therefore, the system call interceptor 112 may determine whether a firewall functionality of the firewall module 212 has been set to prevent data from being communicated out of the computing device 210. If so, the system call interceptor 112 may allow system calls from the application 116 to be delivered to the operating system 122. If not, the system call interceptor 112 may intercept the system calls from the application 116 as discussed herein.

Although not shown in FIGS. 1 and 2, the computing devices 110, 210 may each include a processor and a memory. An example of the computing devices 110, 210 including a processor and a memory is provided herein with respect to FIG. 6. The processor may be a microprocessor, a micro-controller, an application specific integrated circuit (ASIC), or the like, and is to perform various processing functions in the computing device 110, 210. The processing functions may include invoking or implementing the system call interceptor 112.

According to an example, the system call interceptor 112, as well as other features of the computing devices 110, 210 may be sets of machine readable instructions that are stored on the memory, which may be a hardware device. The memory may be, for instance, a volatile or non-volatile memory, such as dynamic random access memory (DRAM), electrically erasable programmable read-only memory (EEPROM), magnetoresistive random access memory (MRAM), memristor, flash memory, floppy disk, a compact disc read only memory (CD-ROM), a digital video disc read only memory (DVD-ROM), or other optical or magnetic media, and the like, on which software may be stored.

In another example, the system call interceptor 112, as well as other features of the computing devices 110, 210 may be hardware components, such as chip components, integrated circuit components, etc. In a further example, the system call interceptor 112 and the other features of the computing devices 110, 210 may be a combination of software and hardware components.

The data storage 124 may be used to store various information that the application 116 may access. For instance, the data storage 124 may store data objects, such as, documents, image files, video files, etc., that the application 116 may access and perform actions upon. The data storage 124 may be volatile and/or non-volatile memory, such as DRAM, EEPROM, MRAM, phase change RAM (PCRAM), memristor, flash memory, and the like. In addition, or alternatively, the data storage 124 may be a device that may read from and write to a removable media, such as, a floppy disk, a CD-ROM, a DVD-ROM, or other optical or magnetic media.

Figure 3:
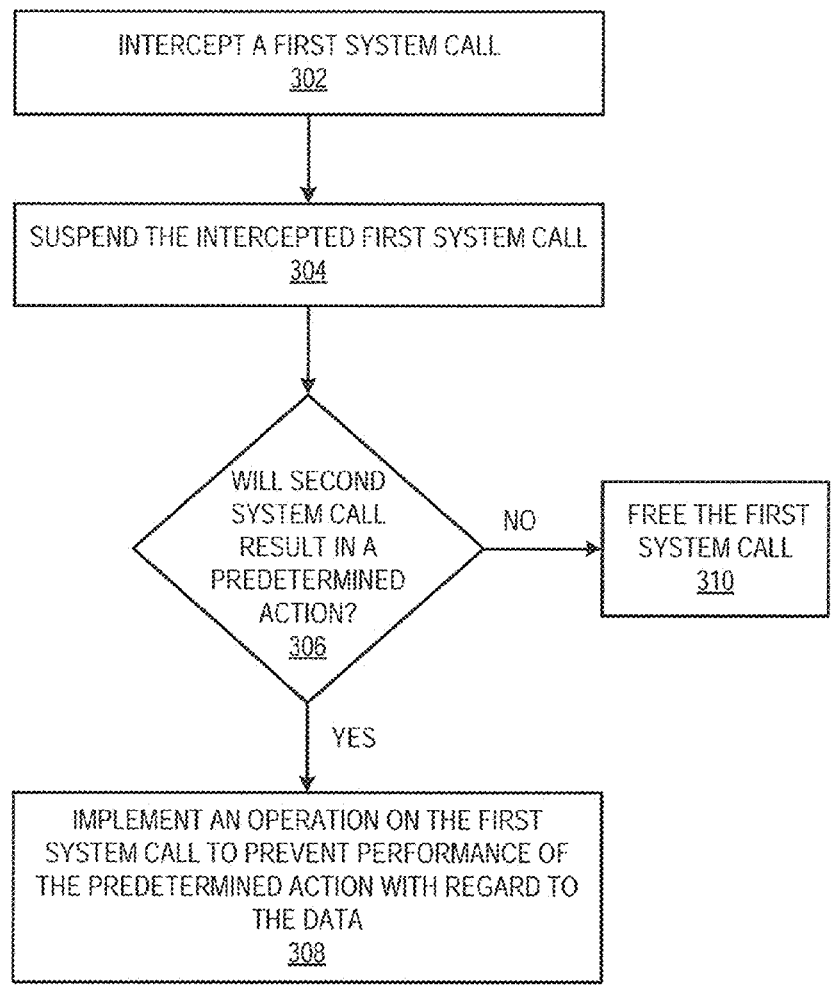
FIGS. 3-5, respectively, depict flow diagrams of methods for preventing performance of a predetermined action regarding a data, according to two examples of the present disclosure.
Figure 4:
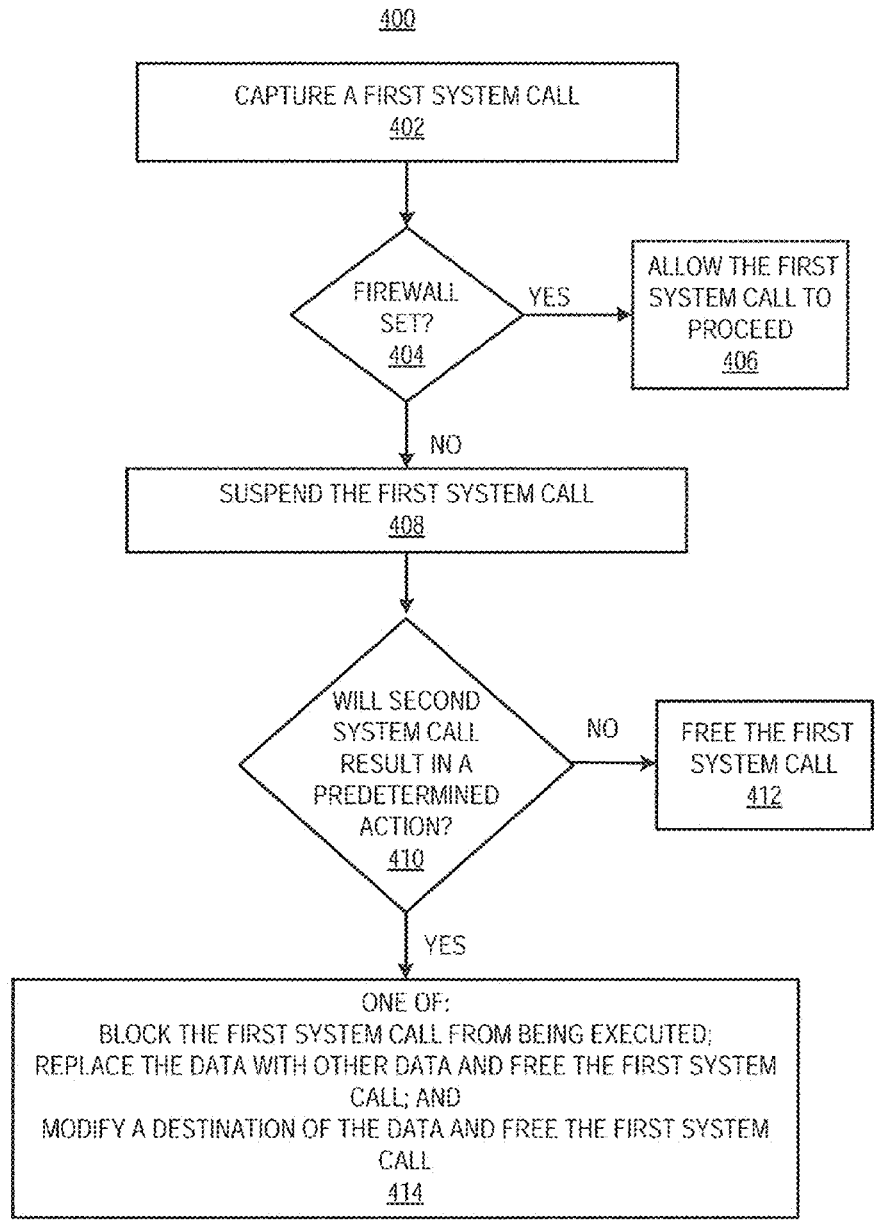
Figure 5:
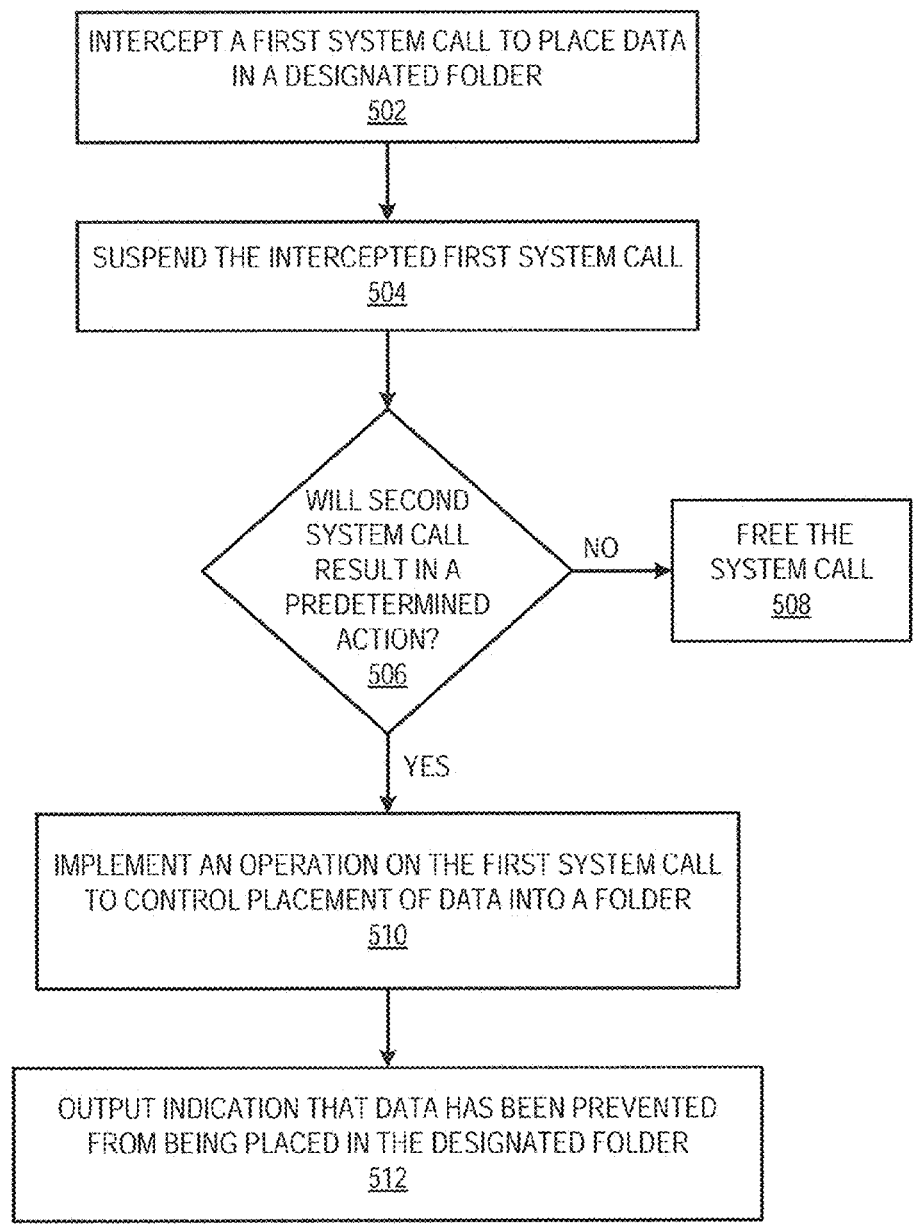

Various manners in which the computing device 110, 210 in general, and the system call interceptor 112 and the analyzing module 114, 222 in particular, may be implemented are discussed in greater detail with respect to the methods 300, 400, and 500 respectively depicted in FIGS. 3, 4, and 5. Particularly, FIGS. 3 and 4 respectively depict flow diagrams of methods 300 and 400 for preventing performance of a predetermined action regarding a data, according to two examples. In addition, FIG. 5 depicts a flow diagram of a method 500 for controlling data placement in a folder, according to an example. It should be apparent to those of ordinary skill in the art that the methods 300, 400, and 500 may represent generalized illustrations and that other operations may be added or existing operations may be removed, modified, or rearranged without departing from the scopes of the methods 300, 400, and 500.

The descriptions of the methods 300, 400, and 500 are made with reference to the computing devices 110, 210 illustrated in FIGS. 1 and 2 for purposes of illustration. It should, however, be clearly understood that apparatuses having other configurations may be implemented to perform the methods 300, 400, and 500 without departing from the scopes of the methods 300, 400, and 500.

With reference first to the method 300 depicted in FIG. 3, at block 302, the system call interceptor 112 may intercept a first system call pertaining to a data. For instance, the first system call may be made to place the data in a folder 120 that is automatically synchronized with a cloud-based data storage provider 130 as discussed above.

At block 304, the intercepted first system call may be suspended. For instance, the system call interceptor 112 may suspend the intercepted system call such that the system call is suspended from reaching the operating system 122.

At block 306, a determination may be made as to whether a second system call that is to be executed following execution of the first system call will result in performance of a predetermined action with regard to the data. For instance, the first system call may be a system call to place data into a folder 120 and the second system call may be system call to output the data contained in the folder 120 to the cloud-based data storage provider 130. In this example, the predetermined action may be to cause the data to be outputted from a computing device 110. As such, the first system call may not directly cause the data to be outputted from the computing device 110, but instead, execution of the first system call may trigger the second system call, which may cause the data to be outputted. The system call interceptor 112 may be programmed with identifications of first system calls that do not directly cause the data to be outputted, but do trigger or result in execution of a second system call that may cause the data to be outputted.

At block 306, the determination as to whether a second system call will result in a predetermined action with regard to the data may be made based upon an analysis of the data and/or the first system call. That is, for instance, the data itself or information pertaining to the data, e.g., metadata, author information, destination information, etc., may be analyzed against a set of predefined policies to make this determination. Various examples of manners in which this determination may be made are discussed above with respect to the analyzing modules 114 and 222 depicted in FIGS. 1 and 2, respectively.

At block 308, in response to a determination that the second system call will result in performance of a predetermined action with regard to the data, an operation on the first system call may be implemented to prevent the predetermined action from occurring. For instance, the system call interceptor 112 may implement the operation in response to a signal from the analyzing module 114, 222 that the second system call will result in the performance of a predetermined action. Various examples of the action that the system call interceptor 112 may implement are described in detail herein.

At block 310, however, in response to a determination that the second system call will not result the performance of a predetermined action with regard to the data, the intercepted first system call may be freed. That is, the system call interceptor 112 may deliver the previously suspended first system call to the operating system 122 and the operating system 122 may execute the first system call. Execution of the first system call by the operating system 122 may result in the triggering of the second system call, in which the second system call may cause the performance of an action with regard to the data, such as the data being communicated out of the computing device 210.

Turning now to the method 400 depicted in FIG. 4, at block 402, the system call interceptor 112 may capture a first system call made to an operating system 122. The first system call may trigger execution of a second system call. By way of example, the first system call may be a call made by an application 116 to place data in a designated folder 120 and the second system call may be a network system call that is to cause the data to be outputted from the designated folder 120. The designated folder 120 may, for instance, be a folder identified and designated as a folder on the computing device 110, 210 that is automatically synchronized with a cloud-based data storage provider 130.

According to an example, the system call detouring agent 118 may have been inserted into the application 116 and the system call detouring agent 118 may be programmed to direct the first system calls placed by the application 116 to the system call interceptor 112. In one example, the system call detouring agent 118 may direct all of the first system calls placed by the application 116 to the system call interceptor 112. In this example, the system call interceptor 112 may determine whether received first system calls are to trigger execution of second system calls, in which the second system calls are to cause data to be outputted from the computing device 110, 210. In another example, the system call detouring agent 118 may determine which system calls are to cause execution of the second system calls to be triggered and may direct those system calls to the system call interceptor 112, while allowing other system calls to be delivered to the operating system 122 without first going to the system call interceptor 112. As a further example, the system call interceptor 112 itself may be the system call detouring agent 118 and may thus be inserted into the application 116 instead of being a separate element. In this example, system calls made by the application 116 may be identified and intercepted prior to the system calls being sent from the application 116.

At block 404, a determination may be made as to whether a sufficient security level firewall functionality that prevents data from being outputted from the computing device 110, 210 or the designated folder 120 has been set. That is, the firewall module 212 may inform the system call interceptor 112 of the firewall functionality to which the firewall module 212 has been set, for instance, the security level setting of the firewall module 212 discussed above. As also discussed above, depending upon the set firewall functionality, the system call interceptor 112 may allow the captured first system call to proceed to the operating system 122 as indicated at block 406 or may suspend the captured first system call as indicated at block 408. For instance, if the security policy is set at a minimum security level and the firewall module 212 is set to block all traffic to the cloud-based data storage provider 130, the system call interceptor 112 may allow the first system call to proceed to the operating system 122 because the firewall module 212 would prevent the data from being outputted from the computing device 110, 210 or the folder 120.

At block 406, in response to a determination that the firewall functionality that prevents data from being outputted from the designated folder 120 has been set, the first system call may be allowed to proceed. That is, for instance, the system call interceptor 112 may deliver the first system call to the operating system 122. In addition, the operating system 122 may execute the first system call, which may trigger the second system call to be executed.

At block 408, in response to a determination that the firewall functionality that prevents data from being outputted from the designated folder 120 has not been set, the system call interceptor 112 may suspend the first system call. That is, for instance, the system call interceptor 112 may delay the delivery of the first system call to the operating system 122.

At block 410, a determination may be made as to whether the second system call will result in performance of a predetermined action with regard to the data. This determination may be made in any of the manners discussed above with respect to the analyzing modules 114 and 222.

In response to a determination that the second system call will result in the performance of a predetermined action with regard to the data, the system call interceptor 112 may free the first system call as indicated at block 412. That is, the system call interceptor 112 may free the first system call by delivering the first system call to the operating system 122. In addition, the operating system 122 may process the first system call.

In response to a determination that the second system call will result in performance of a predetermined action, the system call interceptor 112 may implement an operation on the first system call to prevent the predetermined action from occurring, as indicated at block 414. According to an example, the operation may include blocking the first system call from being executed. In this example, the system call interceptor 112 may block the first system call to prevent the first system call from reaching the operating system 122. As such, the first system call may be blocked to prevent the operating system 122 from executing the first system call. Thus, for instance, the data may be prevented from being placed in the designated folder 120. In one regard, prevention of the data from being placed in the designated folder 120 prevents the data from automatically being uploaded to the cloud-based data storage provider 130 when a synchronization of the folder 120 and the cloud-based data storage provider 130 occurs.

According to another example, the operation may include replacing the data with other data and freeing the first system call with the replaced data. In this example, the data that is the subject of the first system call may be replaced with an empty set of data, a redacted version of the data, an encrypted version of the data, or the like. In one regard, therefore, execution of the first system call may still result in the original version of the data from being prevented outputted from the computing device 110, 210. A copy of the original data may be retained in a corresponding log together with the correspondent policy ID that requested the data modifications.

According to a further example, the operation may include modifying a destination of the data and freeing the first system call. In this example, the destination of the data that is the subject of the first system call may be modified, for instance, to a destination folder that is not automatically synchronized to with an external data storage. In one regard, therefore, execution of the first system call may result in the data being stored in a different destination folder such that execution of the second system call does not result in the data being communicated out of the folder to which the data was originally intended.

In any regard, following block 414, an indication that the data has been prevented from being placed into a synchronized folder may be outputted. For instance, the computing device 110, 210 may display an error, warning or information message, on a display attached to the computing device 110, 210. In addition or alternatively, an active approval may be requested from a user and/or admin to allow the action.

With reference now to the method 500 depicted in FIG. 5, at block 502, the system call interceptor 112 may intercept a system call to place data in a folder 120. The folder 120 may be a folder that is automatically synchronized with a cloud-based data storage provider 130 as discussed above. In addition, the folder 120 may have previously been designated as a folder for which data is to be analyzed prior to permitting the data to be placed into the folder 120. Although the folder 120 has been depicted as being contained in the computing device 110, 210, it should be understood that the folder 120 may be contained externally to the computing device 110, 210 without departing from a scope of the methods disclosed herein.

The system call interceptor 112 may be notified or programmed with the folder 120 designation and may thus monitor all of the system calls made or issued by the application 116 for those system calls that have destinations pointing to the folder 120. Although the system call interceptor 112 has been depicted as receiving communications from the application 116, the system call interceptor 112 may additionally monitor system calls made by other applications on the computing device 110, 120 that may attempt to place data on the folder 120. The system call interceptor 112 may additionally intercept system calls that have destinations pointing to the folder 120, but may not intercept system calls that point to other destinations. That is, the system call interceptor 112 may permit system calls that point to other destinations to proceed to the operating system 122 without first analyzing the data that is the subject of the system calls to determine whether the data is permitted to be placed in the folder 120.

At block 504, the system call interceptor 112 may suspend the intercepted system call. For instance, the system call interceptor 112 may suspend the intercepted system call such that the system call is suspended prior reaching the operating system 122.

At block 506, a determination may be made as to whether a second system call that is to be executed following execution of the first system call will result in performance of a predetermined action with regard to the data. For instance, a determination may be made as to whether the data that is the subject of the system call is permitted to be placed in the folder 120. That is, the data itself or information pertaining to the data, e.g., metadata, author information, destination information, etc., may be analyzed against a set of predefined policies to make this determination. Various examples of manners in which this determination may be made are discussed above with respect to the analyzing modules 114 and 222 depicted in FIGS. 1 and 2, respectively.

At block 508, in response to a determination that the second system call will not result in the performance of a predetermined action with regard to the data, the intercepted system call may be freed. That is, the system call interceptor 112 may deliver the previously suspended system call to the operating system 122 and the operating system 122 may execute the system call. Execution of the first system call by the operating system 122 may result in the data being placed in the designated folder 120.

At block 510, in response to a determination that the second system call will result in the performance of a predetermined action with regard to the data, an operation on the first system call may be implemented to control placement of the data into the folder 120. For instance, the system call may be blocked from being executed. The blocking of the system call, for instance, from reaching the operating system 122, may prevent the operating system 122 from executing the system call, thereby preventing the data from being placed in the folder 120. In addition, prevention of the data from being placed in the folder 120 prevents the data from automatically being uploaded to the cloud-based data storage provider 130 when a synchronization of the folder 120 and the cloud-based data storage provider 130 occurs.

At block 512, an indication that the data has been prevented from being placed in the designated folder 120 may be outputted. For instance, the computing device 110, 210 may display an error message on a display attached to the computing device 110, 210. In addition, or alternatively, following suspension of the first system call, the first system call may be prevented or allowed. The first system call may be allowed following some additional embellishment, such as an approval, authentication, etc. That is, actions performed on the first system call may be defined by corresponding policies set in a system. The policies may specify which system calls to capture, with or without data and/or metadata, which decisions to make, actions to execute, what embellishments to apply and what logs to generate.

Some or all of the operations set forth in the methods 300, 400, and 500 may be contained as utilities, programs, or subprograms, in any desired computer accessible medium. In addition, the methods 300, 400, and 500 may be embodied by computer programs, which may exist in a variety of forms both active and inactive. For example, they may exist as machine readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 6:
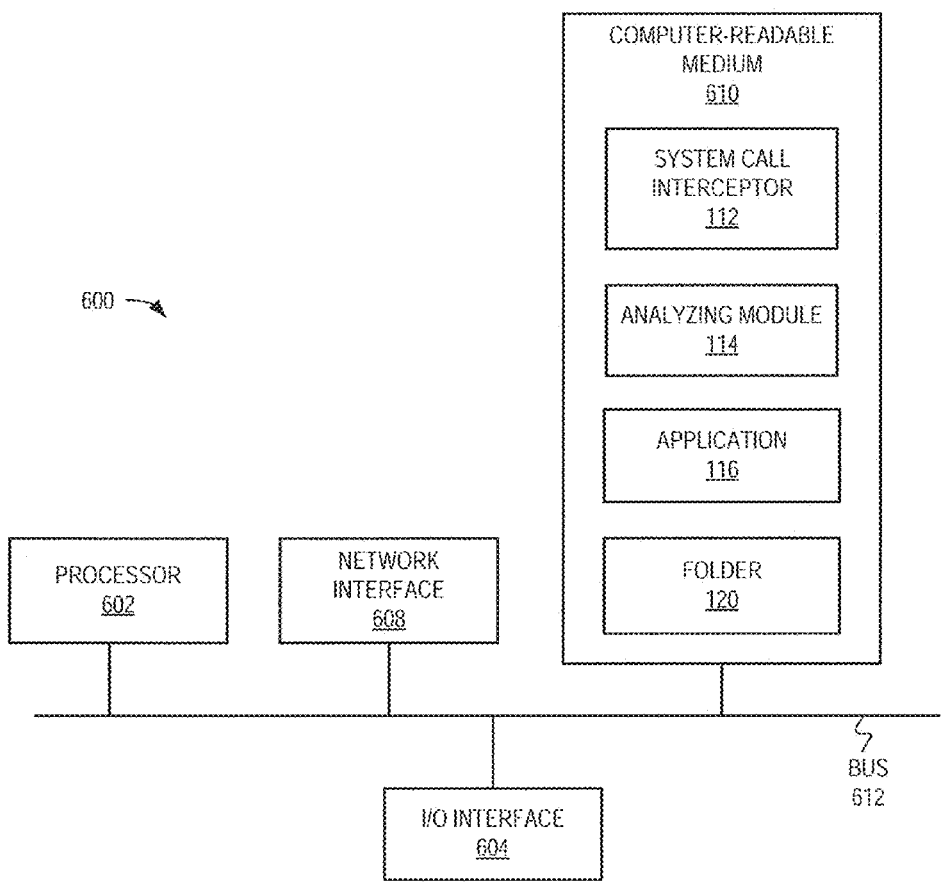
FIG. 6 is schematic representation of a computing device, which may represent either of the computing devices depicted in FIGS. 1 and 2, according to an example of the present disclosure.

Turning now to FIG. 6, there is shown a schematic representation of a computing device 600, which may represent either of the computing devices 110, 210 depicted in FIGS. 1 and 2, according to an example. The computing device 600 may include a processor 602 and an input/output interface 604. The input/output interface 604 may provide an interface with an input device, such as a keyboard, a mouse, etc., and an output device, such as a display. The computing device 600 may also include a network interface 608, such as a Local Area Network LAN, a wireless 802.11x LAN, a 3G mobile WAN or a WiMax WAN, through which the computing device 500 may connect to the network 140. The computing device 600 may further include a computer-readable medium 610 on which is stored sets of machine-readable instructions. Each of these components may be operatively coupled to a bus 612, which may be an EISA, a PCI, a USB, a FireWire, a NuBus, a PDS, or the like.

The computer-readable medium 610 may be any suitable medium that participates in providing instructions to the processor 602 for execution. For example, the computer-readable medium 610 may be non-volatile media, such as an optical or a magnetic disk; volatile media, such as memory. As shown, the computer-readable medium 610 may store the system call interceptor 112, the analyzing module 114, the application 116, and the folder 120. The computer-readable medium 610 may store additional sets of instructions, such as the operating system 122, additional applications, additional folders, etc.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for preventing performance of a predetermined action regarding a data, said method comprising:
   intercepting a first system call pertaining to the data;
   suspending the intercepted first system call;
   determining whether a second system call that is to be executed following execution of the first system call will result in performance of a predetermined action with regard to the data; and
   in response to a determination that the second system call will result in the performance of the predetermined action with regard to the data, implementing, by a processor, an operation on the first system call to prevent the performance of the predetermined action.

2. The method according to claim 1, wherein the first system call is issued by an application running on a computing device to an operating system of the computing device, and wherein intercepting the first system call further comprises intercepting the first system call after the first system call is issued from the application and prior to the first system call reaching the operating system.

3. The method according to claim 2, further comprising:
   freeing the system call in response to a determination that the second system call will not result in the performance of the predetermined action, wherein freeing the system call includes delivering the first system call to the operating system, wherein the operating system is to execute the first system call, and wherein the operating system is to execute the second system call.

4. The method according to claim 1, further comprising one of:

analyzing the data against a predefined set of policies, and wherein determining whether the second system call will result in the performance of the predetermined action comprises determining that the system call will result in the performance of the predetermined action based upon a result of the analysis; and communicating the data to an external computing device that is to compare information pertaining to the data with a set of policies and determine whether the second system call will result in the performance of the predetermined action, and receiving an indication as to whether the second system call will result in the performance of the predetermined action from the external computing device.

5. The method according to claim 1, wherein implementing the operation on the first system call further comprises one of:

blocking the first system call from being executed;

replacing the data with other data and freeing the first system call; and modifying a destination of the data and freeing the first system call.

6. The method according to claim 1, wherein the first system call comprises a system call to one of save the data, copy the data, drop the data, rename the data, and move the data.

7. The method according to claim 1, wherein intercepting the first system call further comprises receiving the first system call from a system call detouring agent, wherein the system call detouring agent is inserted into an application stored on the computing device.

8. The method according to claim 1, wherein the first system call comprises a system call to place the data in a folder that is automatically synchronized with a cloud-based data storage provider and wherein implementing the operation on the first system call further comprises blocking the first system call from being executed to prevent the data from being placed in the folder and the data from being uploaded to the cloud-based data storage provider through the automatic synchronization of the folder.

9. The method according to claim 1, further comprising:

determining whether a firewall functionality is set to prevent data from being communicated out of the computing device;

wherein implementing the operation on the first system call further comprises suspending the system call in response to a determination that the firewall functionality is not set to prevent data from being communicated out of the computing device; and allowing the system call to be processed in response to a determination that the firewall functionality is set to prevent data from being communicated out of the computing device.

10. A computing device comprising:

a processor; and a memory on which is stored machine readable instructions that are to cause the processor to:

capture a first system call issued by an application on the computing device to place data in a folder, wherein execution of the first system call is to trigger execution of a second system call;

suspend the intercepted first system call;

determine whether the second system call will result in an occurrence of a predetermined action with regard to the data; and implement an operation on the first system call to prevent the predetermined action with regard to the data from occurring in response to a determination that the second system will result in occurrence of the predetermined action.

11. The computing device according to claim 10, wherein the machine readable instructions are further to cause the processor to capture the first system call after the first system call is issued from the application and prior to the first system call reaching an operating system of the computing device.

12. The computing device according to claim 10, wherein the machine readable instructions are further to cause the processor to analyze the data against a predefined set of policies and to determine whether the second system call will result in the occurrence of the predetermined action based upon a result of the analysis.

13. The computing device according to claim 10, wherein the machine readable instructions are further to cause the processor to determine that the application has issued a first system call to one of save the data into the folder, copy the data into the folder, drop the data into the folder, rename the data, and move the data into the folder.

14. The computing device according to claim 10, wherein, to implement the operation, the machine readable instructions are further to cause the processor to one of:

block the first system call from being executed;

replace the data with other data and free the first system call; and modify a destination of the data and free the first system call.

15. A non-transitory computer-readable storage medium on which is stored machine readable instructions that when executed by a processor cause the processor to:

determine that an application has issued a first system call to place data in a designated folder, wherein the designated folder is a folder that is to be automatically synchronized with a cloud-based data storage provider;

intercept the first system call;

suspend the intercepted first system call;

determine whether a second system call that is to be executed following execution of the first system call will result in performance of a predetermined action with regard to the data;

in response to a determination that the second system call will result in the performance of a predetermined action with regard to the data, implement an operation on the first system call to prevent the performance of a predetermined action with regard to the data; and in response to a determination that the second system call will not result in the performance of the predetermined action with regard to the data, deliver the first system call to an operating system of a computing device, wherein the operating system is to execute the first system call to cause the data to be placed in the designated folder.

* * * * *